United States Patent [19]
Itoh et al.

[11] Patent Number: 5,412,408
[45] Date of Patent: May 2, 1995

[54] BEAM RECORDING APPARATUS WITH INTENSITY CONTROL

[75] Inventors: Michio Itoh, Hachioji; Hiromichi Yamada, Yokohama, both of Japan

[73] Assignee: Canon Kabushiki Kaisha, Tokyo, Japan

[21] Appl. No.: 64,745

[22] Filed: May 21, 1993

Related U.S. Application Data

[63] Continuation of Ser. No. 744,424, Aug. 13, 1991, abandoned.

[30] Foreign Application Priority Data

Aug. 16, 1990 [JP] Japan ................... 2-216354

[51] Int. Cl.⁶ .......................................... H04N 1/21
[52] U.S. Cl. .................................. 347/132; 358/298
[58] Field of Search .............. 358/296, 298, 300, 302; 346/107 R, 761, 108, 160

[56] References Cited

U.S. PATENT DOCUMENTS

| | | | |
|---|---|---|---|
| 4,257,053 | 3/1981 | Gilbreath | 346/108 |
| 4,878,068 | 10/1989 | Suzuki | 346/108 |
| 5,057,851 | 10/1991 | Hattori | 346/108 |
| 5,155,598 | 10/1992 | Ramekers et al. | 358/298 |

*Primary Examiner*—Mark J. Reinhart
*Attorney, Agent, or Firm*—Fitzpatrick, Cella, Harper & Scinto

[57] ABSTRACT

An image recording apparatus records an image on a recording medium by scanning a spot light beam in accordance with image information. The apparatus has a storage device for storing the image information corresponding in amount to at least three sub-scan lines, and a light intensity controller for increasing and decreasing the intensity the light beam in accordance with the contents of the storage device relative to a standard intensity. A light beam of the standard intensity satisfies a relation of $1.8 \leq d/p$ where d represents a light beam diameter (defined as the diameter at which the light beam intensity lowers to $1/e^2$ (e: base of the natural logarithms) of the intensity at the light beam center, and p represents an interval between respective scan lines.

18 Claims, 9 Drawing Sheets

LIGHT QUANTITY DECISION UNIT

LIGHT QUANTITY DECISION UNIT

LIGHT QUANTITY
DECISION UNIT

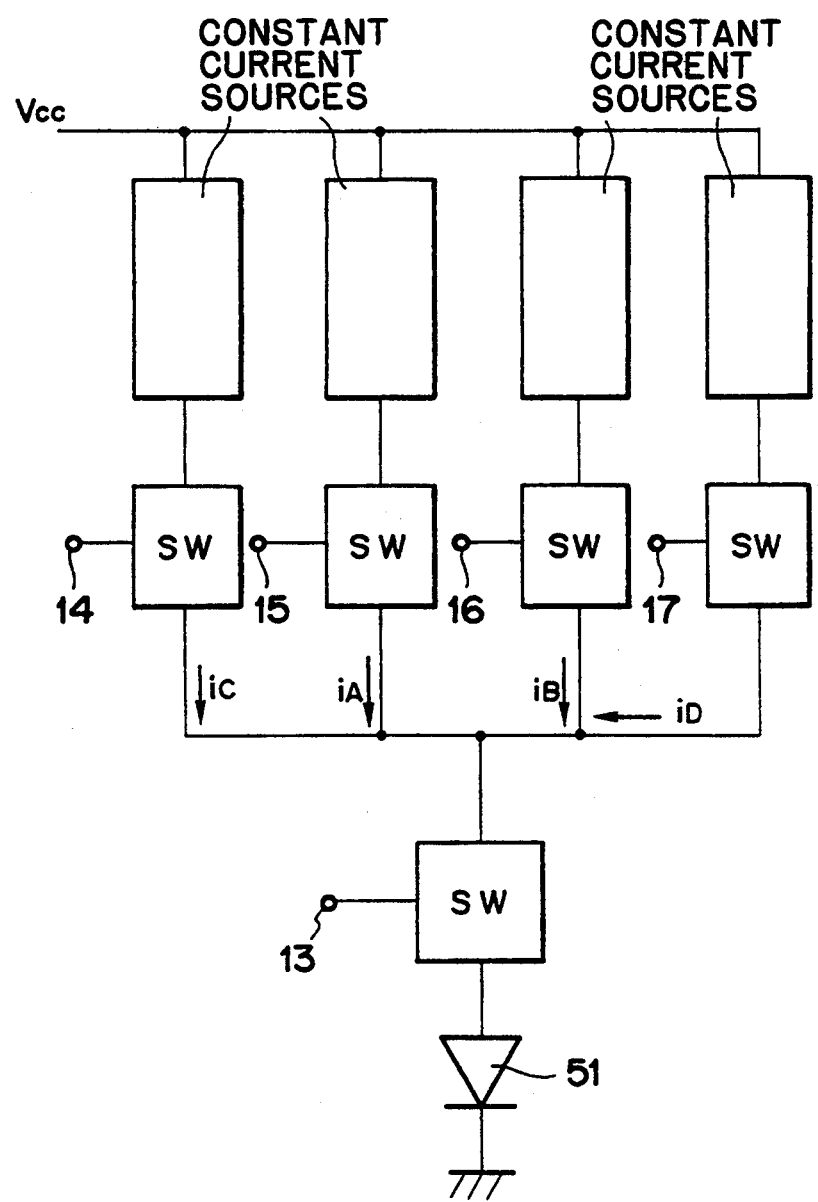

BEAM RECORDING APPARATUS WITH INTENSITY CONTROL

This application is a continuation of application Ser. No. 07/744,424, filed Aug. 13, 1991, abandoned.

BACKGROUND OF THE INVENTION

1. Field of the Invention

The present invention relates to an image recording apparatus, such as a laser printer, LED printer, or liquid crystal printer, for recording an image on a recording medium by digitally applying a light beam.

2. Related Background Art

It is well known that there are apparatuses of the type in which a light beam is modulated in accordance with image information supplied from a computer or the like, and the modulated light beam is focused and scanned on a recording medium to record the image information, by using optical elements such as a light deflector and lens.

For such apparatuses, there are known two methods, one being an image exposure (IE) method which visualizes the area which was exposed to the light beam, and the other being a background exposure (BGE) method which visualizes the area which was not exposed to the light beam.

The IE method is more suitable for printing fine lines and characters, than is the BGE method.

An output image having a high image quality is desired, so a high quality image recording apparatus is now gradually becoming available, which has a recording density of 600 dpi to 1000 dpi.

However, the higher the recording density of such a light beam image recording apparatus becomes, the smaller the area of one pixel becomes, making it more difficult to reproduce such a small pixel.

FIGS. 2A and 2B show the light quantity distribution of a light beam having a diameter of about 100 $\mu$m scanned at recording densities of 300 dpi and 600 dpi, respectively. The light beam diameter is defined as the diameter of the portion of a beam outside of which the light intensity lowers to 1/2 of the intensity at the beam center. In scanning the light beam, only one pixel (one dot) is made ON while the other pixels are made OFF, and on the other hand only one pixel is made OFF while the other pixels are made ON.

The abscissa represents a position in the subscanning direction, and the ordinate represents light quantity. The solid line indicates the light quantity when only one dot is recorded, and a broken line indicates the light quantity when only one dot is not recorded.

FIG. 2A shows the case of the recording density of 300 dpi, and FIG. 2B shows the case of the recording density of 600 dpi.

As seen from FIGS. 2A and 2B, in the case of the recording density of 300 dpi shown in FIG. 2A, the solid line intersects the broken line. Therefore, both one dot ON and one dot OFF are possible, because a certain light amount can be set as the recording threshold level. However, in the case of the recording density of 600 dpi shown in FIG. 2B, the solid line does not intersect the broken line. Therefore, although either one dot ON or one dot OFF is possible by setting a proper recording threshold level, to have both one dot ON and one dot OFF at the same time is impossible. This is true for both the IE and the BGE methods.

The reproducing ability at a high recording density can be improved if the light beam diameter is made small (e.g., in the case of 600 dpi, about 50 $\mu$m). However, in order to make the light beam diameter so small, the optical system required is bulky and complicated, resulting in high cost. This problem becomes more serious as the recording density is made higher.

If such one pixel cannot be reproduced, the quality of an image including small characters or a halftone image using a dither method is degraded considerably.

SUMMARY OF THE INVENTION

It is an object of the present invention to solve the above problem.

It is another object of the present invention to provide a high density image recording apparatus of low cost.

It is a further object of the present invention to provide an image recording apparatus capable of obtaining a high density image of high quality without increasing cost.

It is a still further object of the present invention to provide an image recording apparatus capable of reliably reproducing each pixel of a high density image without increasing cost.

The above and other objects, advantages, and effects of the present invention will become more apparent from the following detailed description when read in connection with the accompanying drawings.

BRIEF DESCRIPTION OF THE DRAWINGS

FIGS. 9A and 9B are block diagrams showing the light quantity detection/processing circuit according to a third embodiment of the present invention.

DETAILED DESCRIPTION OF THE PREFERRED EMBODIMENTS

Preferred embodiments of the present invention will be described in detail.

[1st Embodiment]

Figure 1:
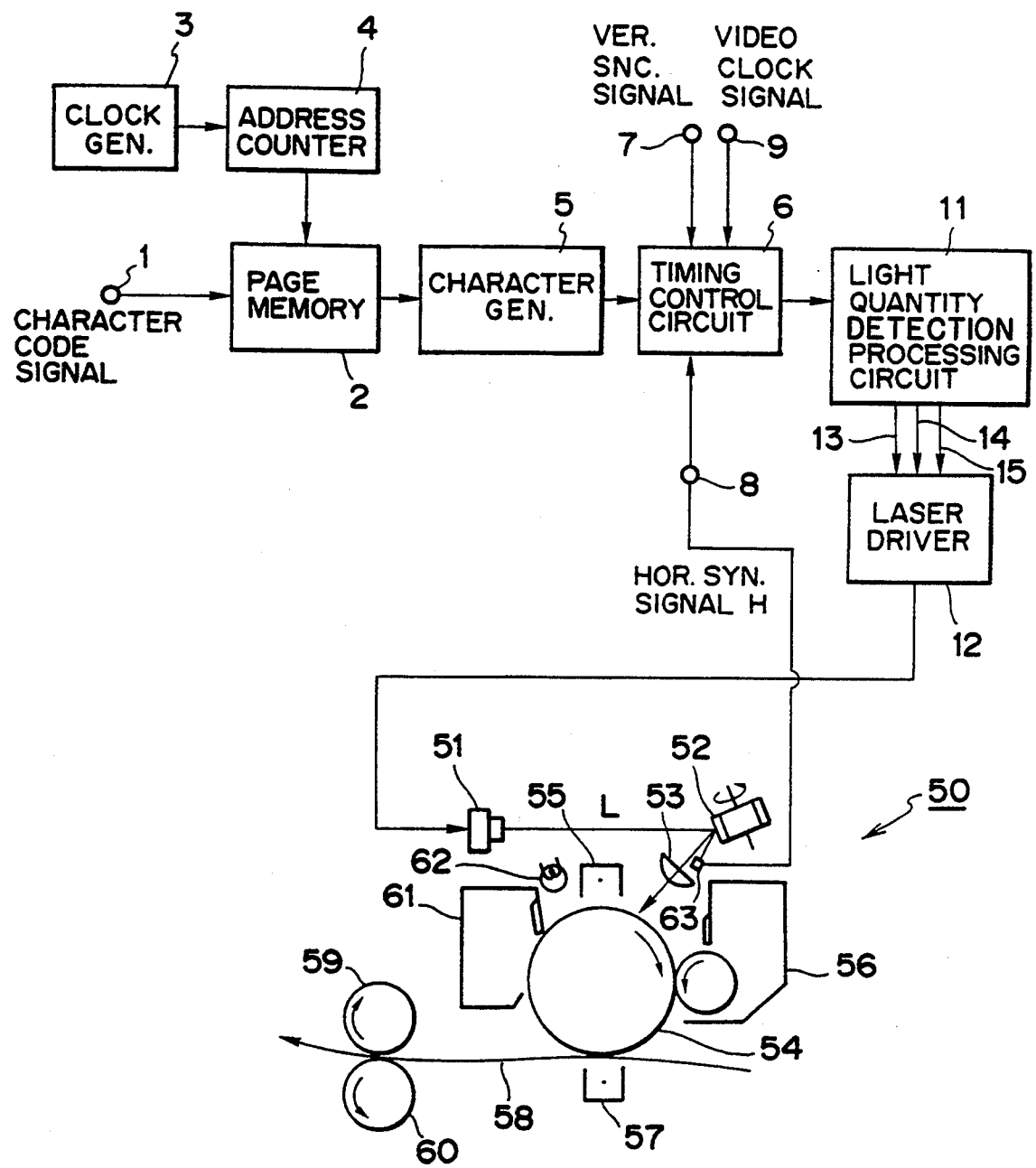
FIG. 1 shows the structure of an image recording apparatus according to a first embodiment of the present invention.

FIG. 1 shows the structure of an image recording apparatus according to a first embodiment of the present invention.

This image recording apparatus has a laser recording apparatus 50 and a modulated signal generating circuit.

Referring to FIG. 1, a laser beam (light beam) L radiated from a semiconductor laser 51 is incident on a rotary polygonal mirror 52 which is mounted on a shaft mounted with a high precision bearing and driven by a constant speed motor. The laser beam L is scanned in the sub-scan direction by the rotary polygonal mirror 52 and focused as a spot by a focussing lens 53 on a photosensitive drum 54 serving as a recording medium.

When the surface of the photosensitive drum 54 is irradiated with the scanned laser beam L, a latent image is formed in drum 54, which has previously been uniformly charged by a charger 55. This latent image is then developed by a developer 56. The developed image pattern on the photosensitive drum 54 is transferred by a transfer charger 57 to a transfer material 58, and then fixed by fixing rollers 59 and 60. The developing liquid on the photosensitive drum 54 not transferred but left unused is collected by a cleaner. Thereafter, electric charge on the photosensitive drum 54 is discharged by a pre-exposure lamp 62, and the above operations can now be repeated.

A beam detector 63 is constructed of an incident light slit and a photoelectric conversion element having a short response time. The beam detector 63 detects the laser beam L and sends its detection signal to a timing control circuit 6 as a horizontal synchro signal H, to determine the radiation start timing of the laser beam L which is applied to the photosensitive drum 54.

Next, the modulated signal generating circuit will be described.

The structure of the modulated signal generating circuit shown in FIG. 1 assumes to be used for recording character information.

In FIG. 1, a character code signal read from a magnetic tape for example is applied to a terminal 1 and sequentially stored in a page memory 2. The character code signal is stored in the page memory 2 at an address designated by an address counter 4 which counts clocks from a clock generator 3.

After character code signals for one page are stored in the page memory, the character code signals are sequentially read starting from the first character code signal at a first row, by using the address counter 4. The read character code signals are input to a character generator 5.

A dot signal corresponding to each character sent from the character generator is sent to a timing control circuit 6 and output therefrom. The timing control circuit 6 operates to synchronize the dot signal with a vertical synchro signal V from a terminal 7, a horizontal synchro signal H from a terminal 8, and a video clock signal from a terminal 9.

A light quantity detection/processing circuit 11 outputs a laser-off signal via an output line 13 to a laser driver 15 if the dot signal from the character generator 5 is for laser-off. If the dot signal is for laser-on, the light quantity detection/processing circuit 11 detects and checks four signals, in accordance with a predetermined decision scheme to be described later, and outputs a laser-on signal having a normal power or high power via an output line 14 or 15 to the laser driver 12. The four signals include: a signal on the scan line one line before the present scan line at the same position as the present dot (hereinafter called an upper signal p5); a signal on the scan line one line after the present scan line at the same position as the present dot (hereinafter called a lower signal p4); a signal on the present scan line at the position one dot before the present dot (hereinafter called a left signal p3); and a signal on the present scan line at the position one dot after the present dot (hereinafter called right signal p2).

Next, an example of a method of detecting the four signals will be described.

Figure 3A:
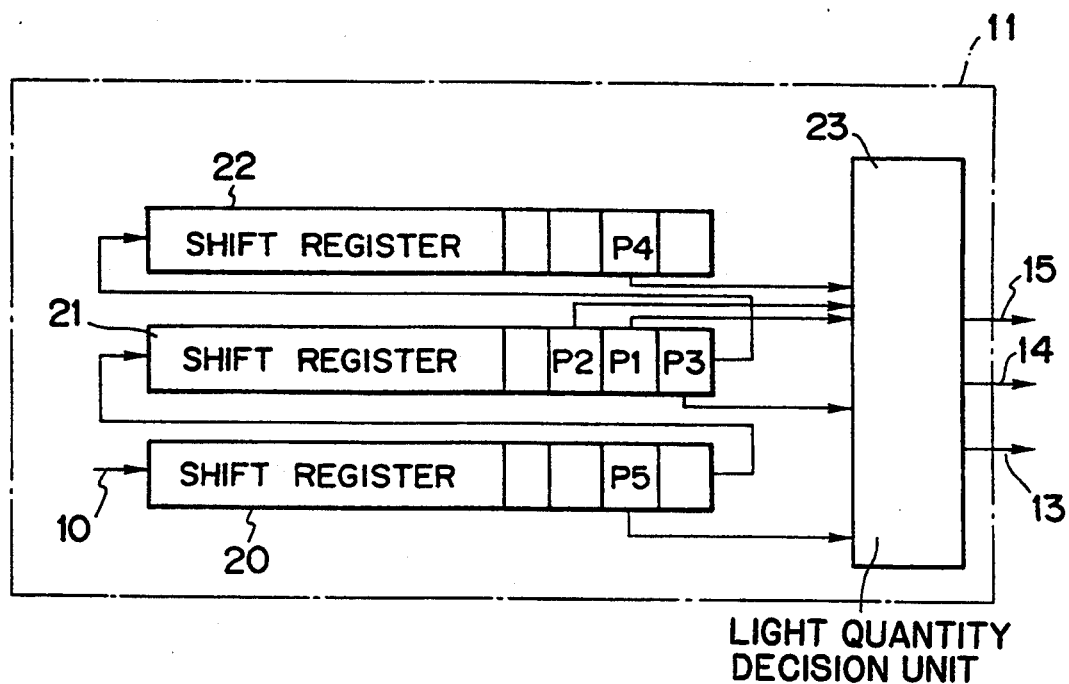
FIG. 3A is a block diagram showing the detail of the light quantity detection/processing circuit shown in FIG. 1.

FIG. 3A is a block diagram showing the detail of the light quantity detection/processing circuit 11.

This light quantity detection/processing circuit 11 has as a storage means three shift registers capable of storing dots signals for three scan lines.

A shift register 22 is used for dot signals on the scan line one line after the present scan line. A shift register 21 is used for dot signals on the present scan line. A shift register 20 is used for dot signals on the scan line one line before the present scan line. The signals including the present signal p1, upper signal p5, left signal p3, right signal p2, and lower signal p4, are supplied to a light quantity decision unit 23 via corresponding signal lines.

If the present signal p1 is for laser-off, the light quantity decision unit 23 outputs a laser-off signal to the output line 13.

If the present signal p1 is for laser-on, the light quantity decision unit 23 outputs a laser-on signal to the laser driver 12 in accordance with the following decision.

Specifically, if all four signals including the upper signal p5, left signal p3, right signal p2, and lower signal p4 are for laser-off, the light quantity decision unit 23 outputs a laser-on signal representative of making strong the laser beam, to the laser driver 12 via the output line 15. In the other cases, i.e., in the case that at least one of the fours signals is for laser-on, the light quantity decision unit 23 outputs a laser-on signal representative of making weak the laser beam, to the laser driver 12 via the signal line 14.

Figure 3B:
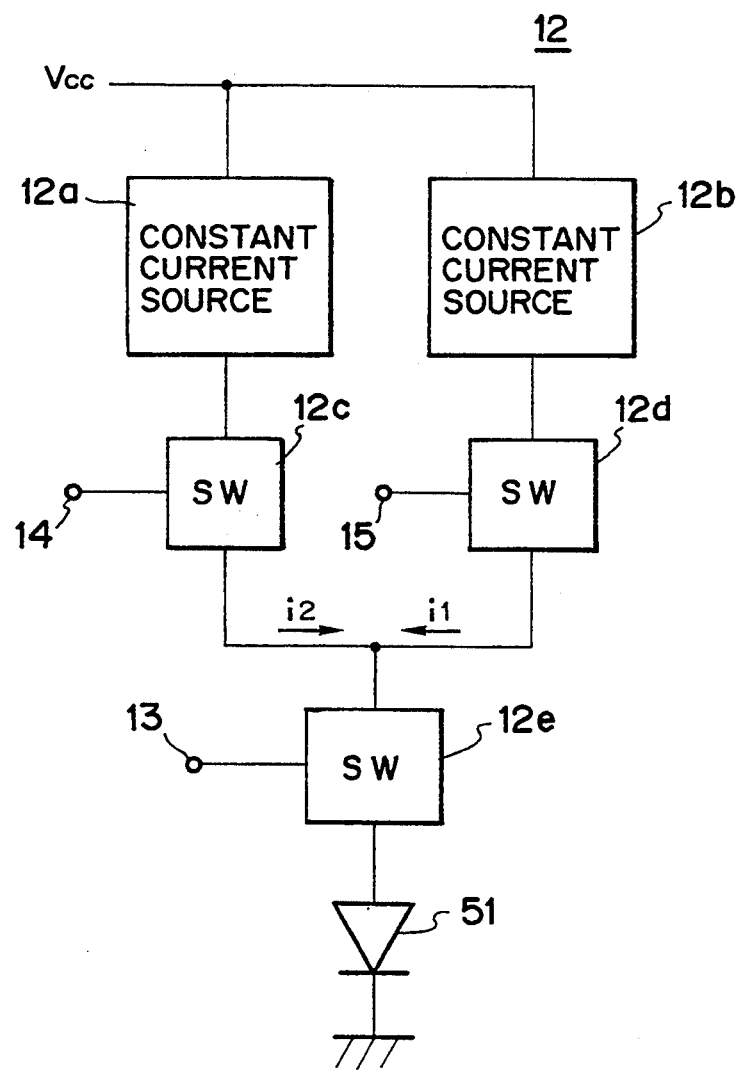
FIG. 3B is a block diagram showing the detail of the laser driver 12 shown in FIG. 1.

As shown in FIG. 3B, signals from the light quantity detection/processing circuit 11 are output via the output lines 13 to 15 to the laser driver 12. The laser driver 12 control s a current (0, i1, or i2) supplied to a semiconductor laser 51 to turn it off, to turn it on with normal power, or to turn it on with strong power.

Figure 4:
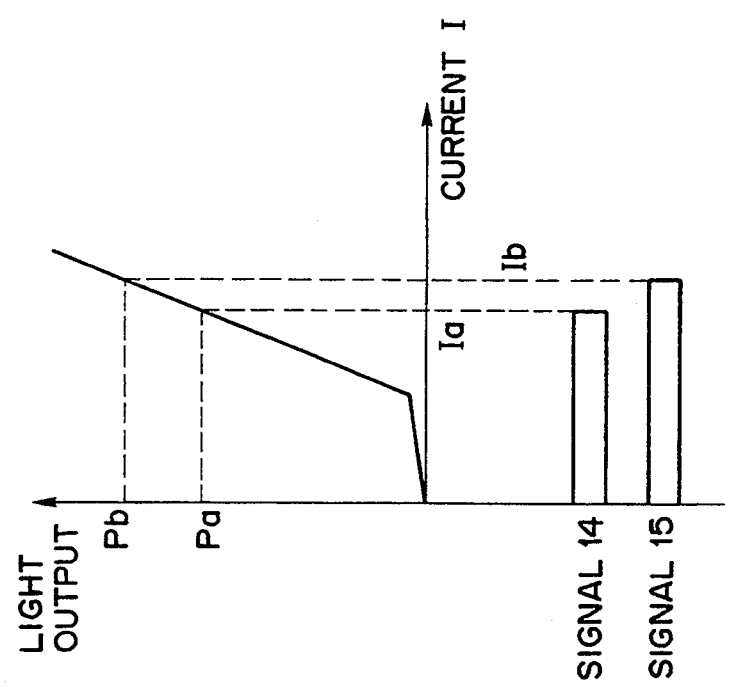
FIG. 4 is a graph showing the relation between an input current and output light quantity of a semiconductor laser.

The relation between an input current and output light quantity of the semiconductor laser 51 is shown in FIG. 4. Specifically, if the signal from the output line 14 is input to the laser driver 12, the laser driver 12 supplies a drive current Ia to the semiconductor laser 51 so that a laser beam with a normal light output quantity Pa is radiated. If the signal from the output line 15 is inputted to the laser driver 51, the laser driver 12 supplies a drive current Ib to the semiconductor laser 51 so that a laser beam with a large light output quantity Pb is radiated.

Figure 5:
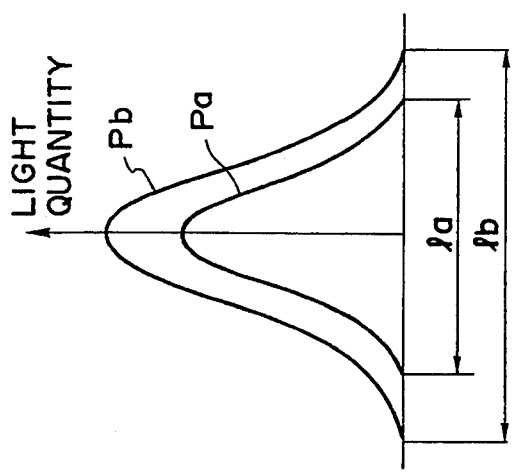
FIG. 5 is a graph showing the light quantity distribution at different light quantities.

The light quantity distribution on a recording medium is shown in FIG. 5 for light quantities Pa and Pb. The light beam diameter can thus be changed between $1a$ and $1b$.

With a conventional IE laser printer having a laser optical system providing a $1/^2$ light beam diameter of about 100 μm, it is not possible to print a single dot at the recording density of 600 dpi. However, with this embodiment, such a single dot can be printed by using a laser quantity as large as about 120% of the normal laser quantity (standard intensity).

Since such a single dot can be reproduced, small characters and halftone images processed by a dither method can be printed with high quality.

Figure 2A:
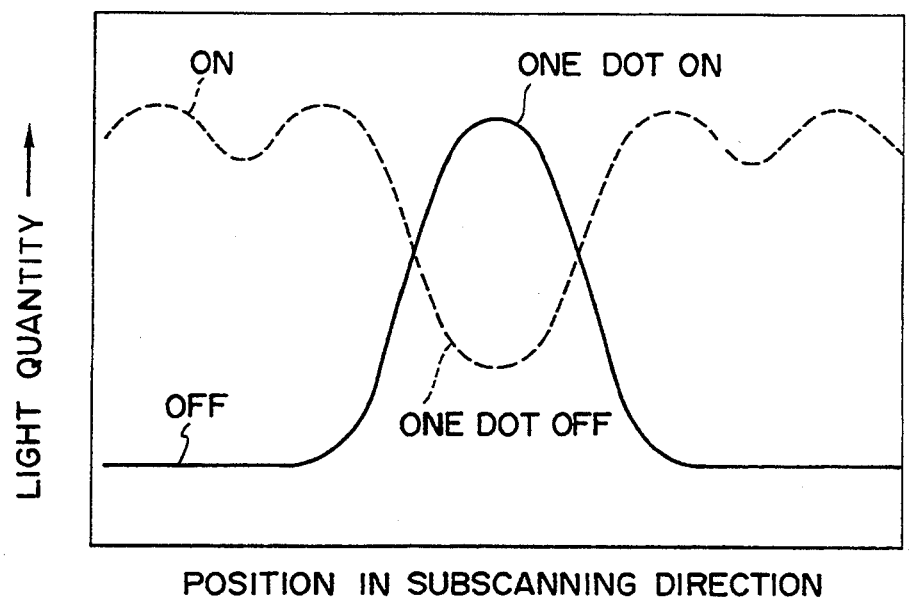
FIGS. 2A and 2B are graphs showing the light quantity distribution obtained using a conventional printer in recording only one pixel within other pixels in a sub-scan line and in not recording only one pixel within other pixels in a sub-scan line.
Figure 2B:
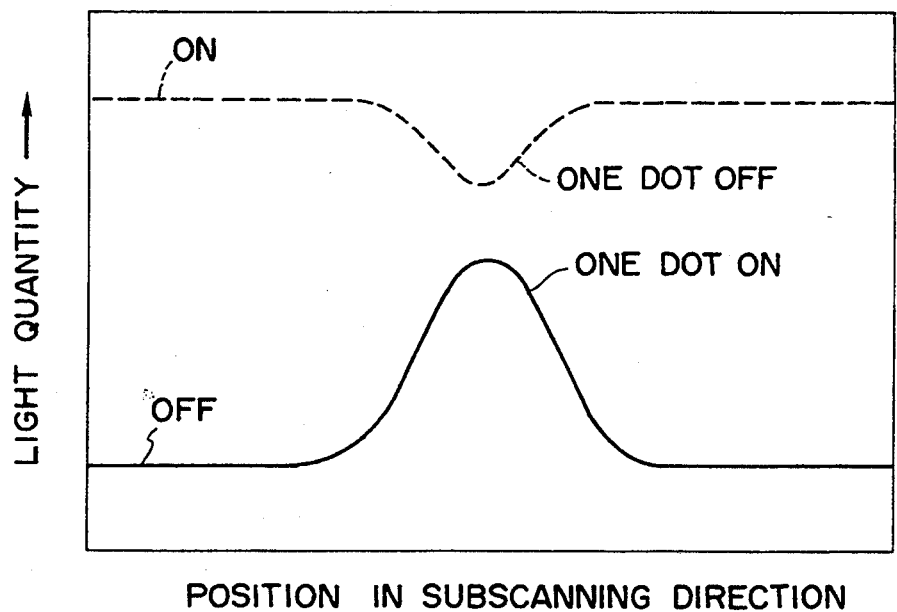
Figure 6:
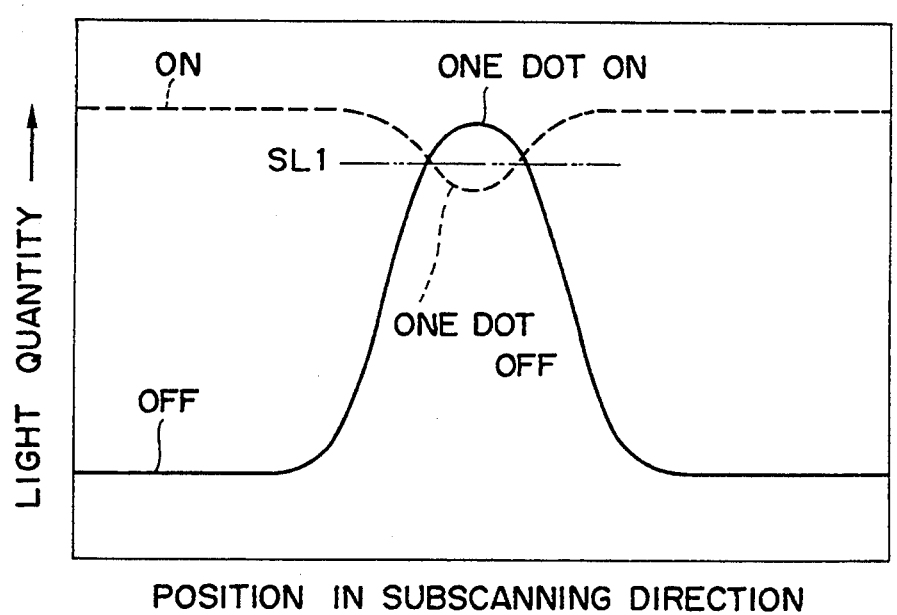
FIG. 6 is a graph showing the light quantity distribution of a light beam obtained using the recording apparatus shown in FIG. 1 in recording only one pixel within other pixels in a sub-scan line and in not recording only one pixel within other pixels in a sub-scan line.

The light quantity distribution for one dot ON and one dot OFF according to the present embodiment is shown in FIG. 6, which shows a distinctive feature of this embodiment as compared with the conventional light quantity distribution shown in FIG. 2B.

Generally speaking, if the ratio d/p becomes near 1.8 where d represents light beam diameter and p represents recording density, then the light quantity distribution curves for one dot ON and one dot OFF do not intersect with each other, and a single dot becomes difficult to be reproduced. The embodiment is effective for such a case, and is particularly effective for $d/p \geq 2.0$. However, for $d/p > 5.0$, it is difficult to reproduce even two dots, reducing the advantage effect of this embodiment.

Generally, the shape of a light beam is a circle or an ellipse. If an elliptical light beam is used, the longer diameter of the ellipse influences the reproduction of one dot print. Therefore, the longer diameter of the ellipse is used as the beam diameter d.

Referring again to FIG. 6, the recording threshold level is set to SL1. The recording threshold level is determined while considering a charge voltage of the charger 55, a development bias of the developer 56, and the like. According to the present embodiment, the recording threshold level can be adjusted to an optimum value. The threshold level may be automatically set to an optimum value, by measuring a surface potential of the photosensitive drum or by measuring the density of a toner image on the photosensitive drum.

[2nd Embodiment]

Figure 7:
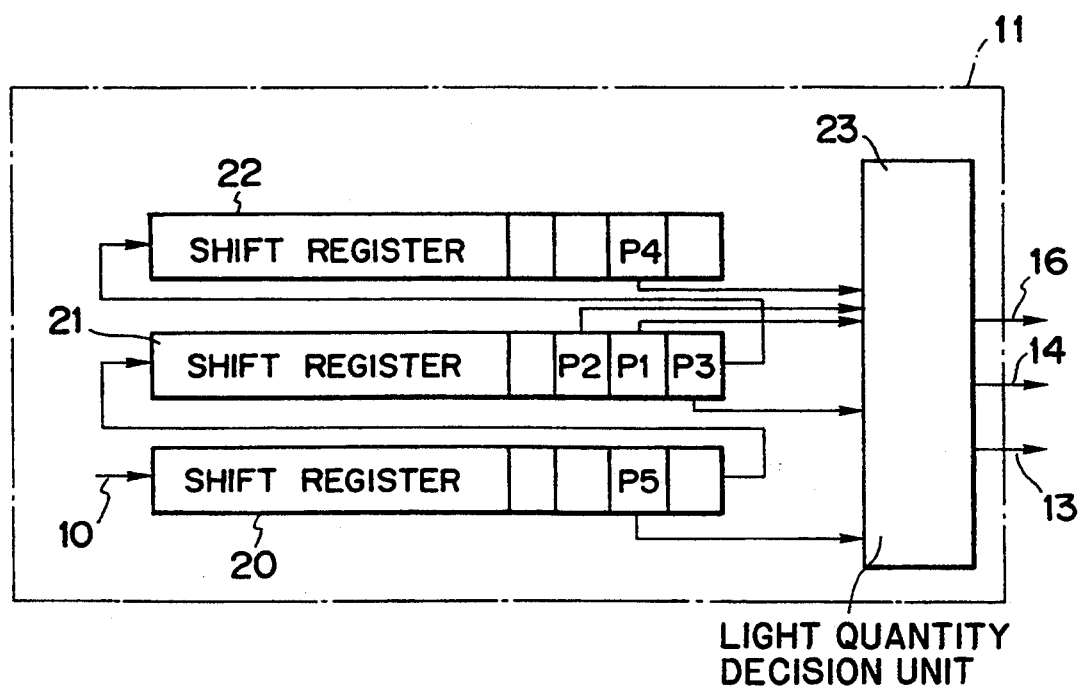
FIG. 7 is a block diagram showing the light quantity detection/processing circuit according to a second embodiment of the present invention.

FIG. 7 is a block diagram showing the light detection/processing circuit 11 according to the second embodiment of the present invention.

In the first embodiment, the light quantity distribution curve for one dot ON is not sufficient at its rising portion. In the second embodiment, this insufficient curve is corrected by increasing the laser light amount. Generally, in printing a dot signal for one dot OFF, a white dot within a group black dots sometimes becomes black, depending upon a threshold level. The second embodiment solves this problem by allowing the threshold level to take a relatively wide range.

Referring to FIG. 7, if the present signal p1 is for laser-off, a light quantity decision unit 23′ outputs a laser-off signal to an output line 13. If the present signal p1 is for laser-on and at least one of the four signals p2, p3, p4, and p5 is for laser-off, the light quantity decision unit 23′ outputs a signal representative of making small the laser beam light quantity, to an output line 16.

If the present signal is for laser-on and at least two of the four signals p2, p3, p4, and p5 are for laser-off or all four signals are for laser-on, the light quantity decision unit 23′ outputs a signal representative of making normal the laser beam light quantity, to an output line 15. The structure of a laser drive 12 may use that shown in FIG. 3B. In this case, instead of the output line 14, the output line 16 is used to make the output current from the constant current source 12a small.

Figure 8:
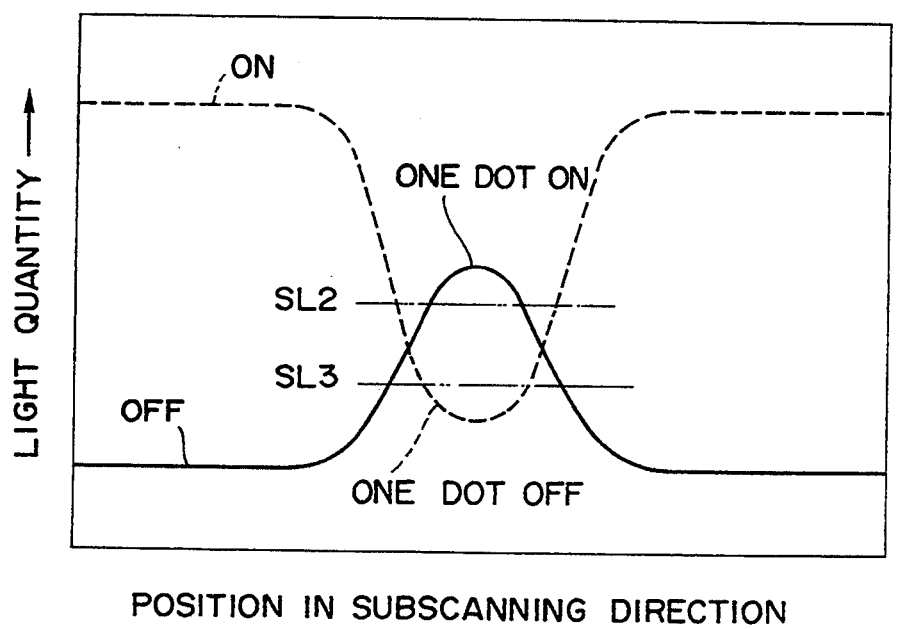
FIG. 8 is a graph showing the light quantity distribution of a light beam obtained using the light quantity detection/processing circuit shown in FIG. 7 in recording only one pixel within other pixels in a sub-scan line and in not recording only one pixel within other pixels in a sub-scan line.

When the smaller laser beam quantity is set to 70% of the normal laser beam quantity, a good image with one white dot can be obtained using the printer similar to the first embodiment. FIG. 8 shows the light quantity distribution for one dot ON and one dot OFF according to the second embodiment.

[3rd Embodiment]

Figure 9A:
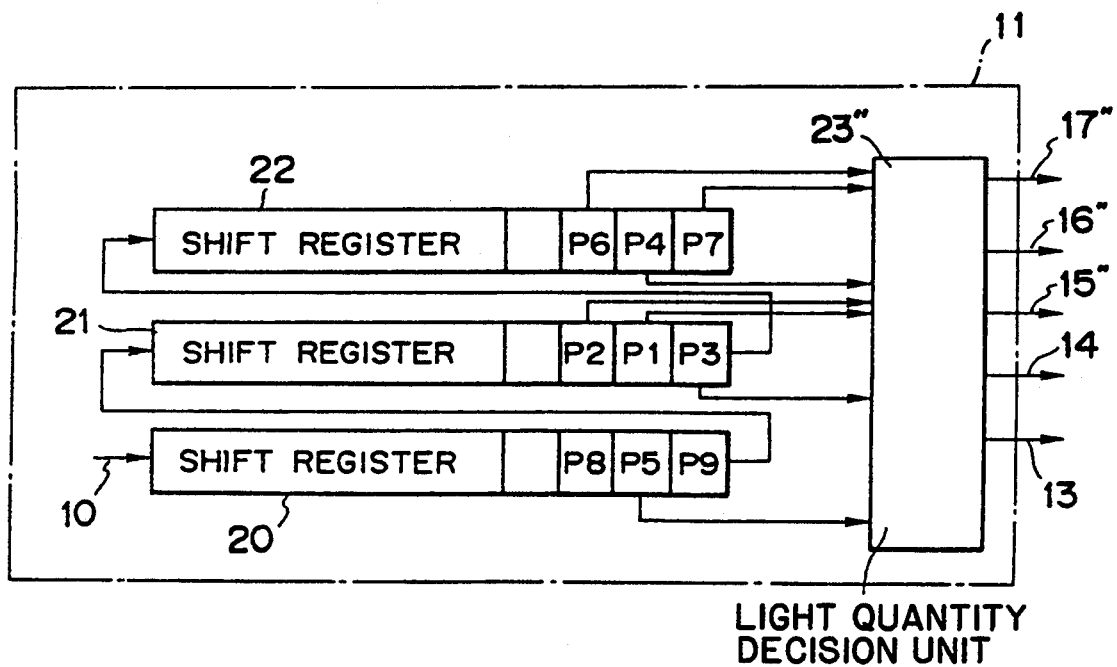

FIG. 9A is a block diagram showing the detail of the light quantity detection/processing circuit according to the third embodiment of the present invention.

The apparatus of the third embodiment has the outline similar to the second and third embodiments. In the third embodiment, the light quantity detection/processing circuit is improved to allow a high quality image output.

The light quantity detection/processing circuit detects eight signals including: a signal before one dot of p5 (hereinafter called an upper left signal p9); the upper signal p5; a signal one dot after p5 (hereinafter called an upper right signal p8); the lower signal p4; a signal before one dot of p4 (hereinafter called a lower left signal p7); a signal after one dot of p4 (hereinafter called a lower right signal p6); the left signal p3; and the right signal p2.

If the present signal p1 is for laser-off, a light quantity decision unit 23″ outputs a laser-off signal to an output terminal 13.

If the present signal p1 is for laser-on, the light quantity decision unit 23″ executes the following four controls.

(1) If all eight signals p2 to p9 are for laser-off, a signal representative of a laser beam quantity A is outputted to an output line 15″.

(2) If all eight signals p2 to p9 are for laser-off, a signal representative of a laser beam quantity B is outputted to an output line 16″.

(3) If only one of eight signals p2 to p8 is for laser-off, a signal representative of a laser beam quantity D is outputted to an output terminal 17″.

(4) For the case other than (1) to (3), a signal representative of a normal laser beam quantity C is outputted to an output line 14.

An example of the structure of a laser driver 12 for this embodiment is shown in FIG. 9B. One of currents $i_A$ to $i_B$ is supplied to the semiconductor while making the relation between the four laser beam quantities satisfy $A \geq B > C \geq D$ or $A \geq B \geq C > D$.

According to the third embodiment, a threshold level can be set within a range wider than that of the second embodiment, resulting in a high quality image and a simplified electrophotography process control.

With a laser printer having the structure of embodiment and a laser optical system providing a $1/e^2$ light beam diameter of about 85 μm, it is possible to print a single black dot within a group of white dots, or a single white dot within a group of black dots, at a recording density of 1000 dpi, under the conditions that the quantity A is 130% of the normal quantity C, the quantity B is 120% thereof, and the quantity D is 80% thereof. Furthermore, no pitch variation in the subscanning direction is found in printing an image having all black dot areas, resulting in a high quality image.

Although the above embodiments have been described using a laser printer by way of example, the present invent ion is not limited thereto, but i s applicable to other electrophotography type printers such as LED printers and liquid crystal printers.

Furthermore, in the above embodiments, an ID type image recording apparatus has been used wherein a developing agent is attached to the area where a light beam is applied. The present invention is not limited thereto, but is applicable to BGE type image recording apparatuses.

Still further, although a method of controlling a light beam intensity has been described, other methods may be used such as a method of controlling the time during which a laser beam is applied, and a method of controlling a laser beam intermittently.

In the present invention, in accordance with the image information of spots adjacent a light beam spot to be printed, the light beam intensity is controlled. Therefore, an image recording apparatus, particularly an image recording apparatus operated at a high recording density, can reliably print a one dot ON signal and one dot OFF signal. A small character image and a halftone image obtained through binarization such as a dither method can be printed clearly and with high quality.

What is claimed is:

1. An image recording apparatus for recording an image on a recording medium by scanning a spot light beam in accordance with image information, comprising:

storage means for storing the image information corresponding in amount of at least three scan lines; and light intensity controlling means for increasing and/or decreasing the intensity of the light beam in accordance with the contents of said storage means relative to a standard intensity, wherein a light beam of said standard intensity satisfies a relation $1.8 \leq d/p$ where d represents a light beam diameter defined as the diameter at which the light beam intensity lowers to $1/e^2$ (e being the base of the natural logarithms) of the intensity at the light beam center, and p represents an interval between respective scan lines.

2. An image recording apparatus according to claim 1, wherein said light intensity controlling means increases the intensity of the light beam applied to a subject pixel to be printed, if all of at least four pixels including the upper and lower pixels in the main scan direction relative to the subject pixel and right and left pixels in the sub-scan direction relative to the subject pixel, are not to be irradiated with the light beam.

3. An image recording apparatus according to claim 1, wherein said light intensity controlling means decreases the intensity of the light beam applied to a subject pixel to be printed, if any one of at least four pixels, namely upper and lower pixels in the main scan direction relative to the subject pixel and right and left pixels in the sub-scan direction relative to the subject pixel, is to be irradiated with the light beam.

4. An image recording apparatus according to claim 1, wherein said light intensity controlling means controls the intensity of the light beam applied to a subject pixel to be printed such that the intensity of the light beam is set to a value A if all eight pixels adjacent to the subject pixel are not to be irradiated with the light beam, the intensity of the light beam is set to a value B if all the eight pixels are to be irradiated with the light beam, the intensity of the light beam is set to a value D if only one of the eight pixels is not to be irradiated with the light beam, and the intensity of the light beam is set to a value C for other cases, the intensities of the light beam A to D satisfying the relation $A \geq B > C \geq D$ or $A \geq B \geq C > D$.

5. An image recording apparatus according to claim 1, wherein said apparatus records an image using a laser beam and an electrophotography scheme.

6. An image recording apparatus according to claim 5, wherein toner is attached to an area of said recording medium where the laser beam is applied.

7. An image recording apparatus according to claim 5, wherein toner is attached to an area of said recording medium where the laser beam is not applied.

8. An image recording apparatus according to claim 5, further comprising process controlling means for controlling an electrophotography process so as to set a desired recording threshold level.

9. An image recording apparatus which uses light beam modulated by pixel data, comprising:

light beam generating means for generating the light beam having a beam diameter d defined as the diameter at which the light beam intensity lowers to $1/e^2$ (e being the base of the natural logarithms) of the light beam intensity at the light beam center; and beam scanning means for scanning the beam at the scan line interval p, wherein $d/p \geq 1.8$.

10. An image recording apparatus according to claim 9, wherein $d/p \geq 2.0$.

11. An image recording apparatus according to claim 9, further comprising means for controlling the time period while the light beam is applied to a subject pixel to be printed, in accordance with data of pixels adjacent to the subject pixel.

12. An image recording apparatus according to claim 9, further comprising means for controlling said beam generating means such that the light beam is continuously or intermittently applied to a subject pixel in accordance with data of pixels adjacent to the subject pixel.

13. An image recording apparatus according to claim 9, further comprising storage means for storing the pixel data in amount of at least three scan lines.

14. An image recording apparatus according to claim 13, further comprising light intensity controlling means for increasing and/or decreasing the intensity of the light beam in accordance with the contents of said storage means.

15. An image recording apparatus according to claim 9, wherein said apparatus records an image using a laser beam and an electrophotography scheme.

16. An image recording apparatus according to claim 15, wherein toner is attached to an area of a recording medium where the laser beam is applied.

17. An image recording apparatus according to claim 15, wherein toner is attached to an area of a recording medium where the laser beam is not applied.

18. An image recording apparatus according to claim 9, further comprising process control means for controlling an electrophotography process so as to set a desired recording threshold level.

* * * * *

UNITED STATES PATENT AND TRADEMARK OFFICE
CERTIFICATE OF CORRECTION

PATENT NO. : 5,412,408                    Page 1 of 2
DATED : May 2, 1995
INVENTOR(S) : Michio Itoh, et al.

It is certified that error appears in the above-indentified patent and that said Letters Patent is hereby corrected as shown below:

ON TITLE PAGE

IN [57] ABSTRACT:
      Line 7, "intensity" should read --intensity of--.
      Line 10, "of" should be deleted.
      Line 15, "center," should read --center),--.
      Line 14, "respective" should be deleted.

COLUMN 1

Line 29, "characters," should read --characters--.
    Line 43, "$1/^2$" should read --$1/e^2$--.

COLUMN 3

Line 19, "focussing" should read --focusing--.
    Line 23, "drum 54," should read --the drum 54,--.

COLUMN 4

Line 44, "fours" should read --four--.
    Line 51, "control s" should read --controls--.
    Line 62, "driver 51" should read --driver 12--.

COLUMN 5

Line 2, "$1/^2$" should read --$1/e^2$--.
    Line 21, "embodiment" should read --present embodiment--.
    Line 24, "advantage" should read --advantageous--.
    Line 51, "group" should read --group of--.
    Line 67, "drive 12" should read --driver 12--.

UNITED STATES PATENT AND TRADEMARK OFFICE
CERTIFICATE OF CORRECTION

PATENT NO. : 5,412,408
DATED : May 2, 1995
INVENTOR(S) : Michio Itoh, et al.

It is certified that error appears in the above-indentified patent and that said Letters Patent is hereby corrected as shown below:

<u>COLUMN 6</u>

```
Line 15, "second and third embodiments." should read
         --first and second embodiments.--.
Line 36, "outputted" should read --output--.
Line 39, "outputted" should read --output--.
Line 40, "p8" should read --p9--.
Line 42, "outputted" should read --output--.
Line 45, "putted" should read --put--.
Line 55, "embodi-" should read --this embodi- --.
Line 67, "pre" should read --pre- --.
Line 68, "invent ion" should read --invention-- and
         "i s" should read --is--.
```

<u>COLUMN 8</u>

```
Line 20, "light" should read --a light--.
```

Signed and Sealed this

Sixth Day of August, 1996

Attest:

BRUCE LEHMAN

*Attesting Officer*    Commissioner of Patents and Trademarks